US011126440B1

(12) United States Patent
Rajendran et al.

(10) Patent No.: US 11,126,440 B1
(45) Date of Patent: Sep. 21, 2021

(54) IDENTIFYING CRITICAL THERMAL CONDITIONS IN MULTIPLE SYSTEM-ON-A-CHIP (SOC) SYSTEMS

(71) Applicant: Amazon Technologies, Inc., Seattle, WA (US)

(72) Inventors: Lalithkumar Rajendran, Austin, TX (US); Jun woo Park, Austin, TX (US); Garrick Chow, Foster City, CA (US); Austin Bryant, Austin, TX (US); Yi Li, Austin, TX (US); Hua Wang, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/911,644

(22) Filed: Jun. 25, 2020

(51) Int. Cl.
| | |
|---|---|
| *G06F 9/4401* | (2018.01) |
| *G01K 3/00* | (2006.01) |
| *G06F 13/10* | (2006.01) |
| *G06F 13/42* | (2006.01) |
| *G01K 7/22* | (2006.01) |
| *G06F 1/20* | (2006.01) |

(52) U.S. Cl.
CPC .......... *G06F 9/4401* (2013.01); *G01K 3/005* (2013.01); *G01K 7/22* (2013.01); *G06F 1/206* (2013.01); *G06F 13/10* (2013.01); *G06F 13/4282* (2013.01); *G06F 2213/0002* (2013.01)

(58) Field of Classification Search
CPC .... G06F 9/4401; G06F 13/10; G06F 13/4282; G06F 1/206; G06F 2213/0002; G01K 3/005; G01K 7/22
See application file for complete search history.

(56) References Cited

U.S. PATENT DOCUMENTS

| | | | | |
|---|---|---|---|---|
| 8,786,449 B1* | 7/2014 | Kraipak | ................. | G06F 1/206 340/584 |
| 10,725,531 B1* | 7/2020 | Ichapurapu | ............. | G06F 1/324 |
| 2013/0227261 A1* | 8/2013 | Anderson | ............. | G06F 9/4401 713/2 |
| 2015/0082076 A1* | 3/2015 | Jagmag | ................. | G06F 1/3203 713/600 |
| 2015/0169016 A1* | 6/2015 | Doshi | ..................... | G06F 1/324 713/320 |
| 2017/0220445 A1* | 8/2017 | Cunningham | ...... | G06F 11/3089 |
| 2019/0384367 A1* | 12/2019 | Jain | ........................ | G06F 1/206 |

\* cited by examiner

*Primary Examiner* — Glenn A. Auve
(74) *Attorney, Agent, or Firm* — Lee & Hayes, P.C.

(57) ABSTRACT

Techniques for identifying thermal critical conditions in devices with multiple SoCs, and coordinating the resetting and rebooting of the SoCs to recover from the thermal critical conditions are described herein. A device may include a first SoC that monitors a first temperature sensor, and a second SoC that monitors a second temperature sensor, to determine whether temperatures in the device indicate thermal critical conditions. The second SoC may determine that a temperature determined using the second temperature sensor is above a threshold indicating a thermal critical condition, and may provide an indication to the first SoC that the temperature is above the threshold. The first SoC may detect the indication, and the first SoC and second SoC may each reset to allow the device to cool down. The first SoC and second SoC may then coordinate rebooting once the thermal critical condition is no longer detected in the device.

20 Claims, 10 Drawing Sheets

IDENTIFYING CRITICAL THERMAL CONDITIONS IN MULTIPLE SYSTEM-ON-A-CHIP (SOC) SYSTEMS

BACKGROUND

The capabilities of user devices continue to increase to provide users with more favorable and diverse user experiences. To support this increase in functionality, user devices have begun to include a variety of different hardware components, such as displays, microphones, speakers, radios, and so forth, as well as software components, such as virtual-assistant applications, voice-recognition components, media players, and so forth. Often, user devices include a system-on-a-chip (SoC) to support the various hardware and software components included the in the user devices. However, a single SoC may lack the necessary amount of computing power, memory, input/output (I/O) interfaces, or other resource, to support the various hardware and software components of complex user devices.

To support the increased functionality, user devices may include multiple SoCs that are responsible for managing different components or systems of user devices. While multiple SoCs provide computing resources necessary to support the increase in functionality of user devices, the SoCs may have to coordinate with each other to ensure the user device functions properly, and to maintain a consistent and enjoyable user experience. However, various difficulties may arise when coordinating the operations of multiple SoCs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 illustrates one of the SoCs detecting a thermal critical condition, and notifying the other SoC of the thermal critical condition over an interface. The two SoCs then coordinate resetting their respective processors to respective bootloaders, and when the thermal critical condition has cleared, launching the operating systems of the multiple SoCs to resume normal operation of the user device.

DETAILED DESCRIPTION

Figure 1:
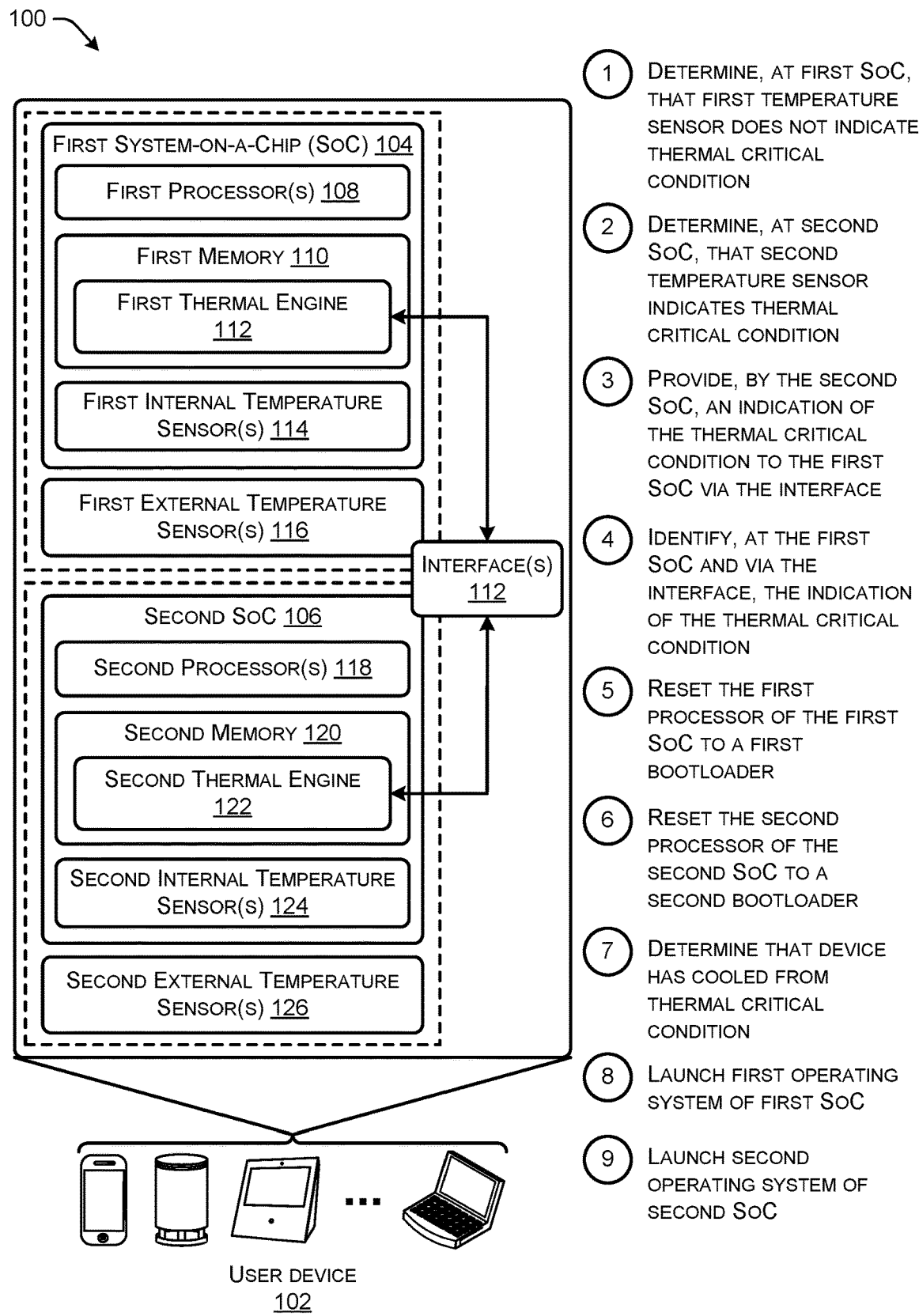
FIG. 1 illustrates an example environment including a user device with multiple SoCs that each monitor one or more respective temperatures sensors.

This disclosure describes techniques for identifying thermal critical conditions in user devices with multiple SoCs, and coordinating the resetting and rebooting of the SoCs to recover from the thermal critical condition. A user device may include a first SoC that monitors a first temperature sensor (e.g., thermistor), and a second SoC that monitors a second temperature sensor, to determine whether temperatures indicated by the sensors are above threshold temperatures indicating thermal critical conditions. In this way, even if the first SoC determines that a first temperature indicated by the first temperature sensor is below a threshold temperature, the second SoC may determine that a second temperature indicated by the second temperature sensor is above a threshold temperature indicating a thermal critical condition. The second SoC may provide an indication to the first SoC using a communication interface that the second temperature is above the threshold temperature. The first SoC may detect the indication, and the first SoC and second SoC may each reset to allow the user device to cool down.

After resetting, the first SoC and second SoC may be configured to reboot to respective bootloaders that monitor the temperatures indicated by the first and second temperature sensors. Once the bootloaders determine that the temperatures indicated by the first and second temperature sensors are below threshold temperatures, the bootloaders may launch kernels on the first SoC and the second SoC to resume normal operations for the user device. In this way, a user device with multiple SoCs may coordinate the identification of, and recovery from, thermal critical conditions such that the user device is able to efficiently recover from thermal critical conditions.

User devices often perform passive cooling techniques to reduce power consumption by components of the devices, thereby reducing heat produced by the components. For instance, user devices often reduce brightness on displays, shut down non-essential programs or applications, and so forth. However, user devices may reach thermal critical conditions, which may generally correspond to temperatures that are too high to reduce using passive cooling techniques. Thus, user devices that experience thermal critical conditions may need to be powered down entirely, or reset to a low power mode, for a cooling period to allow the temperatures to lower and the thermal critical condition to pass. Devices with a single SoC are able to easily identify and recover from thermal critical conditions as a single SoC is tasked with monitoring all the temperature sensors to detect any thermal critical condition, and is also controlling all components of the devices to ensure that all devices power down. However, user devices with multiple SoCs may be unable to efficiently coordinate detecting, and recovering from, thermal critical conditions. For instance, the SoCs may have internal temperature sensors that are included in the packaging of the SoCs that are only accessible by the respective SoCs. Thus, a first SoC may be unaware that the second SoC has experienced a thermal critical condition because the first SoC is unable to monitor temperatures from the second SoC's internal temperature sensor.

As described herein, a thermal critical condition may generally correspond to threshold temperature values that when temperatures reach, or are above, comprise the safety of the device. In some instances, temperature sensors in the device may have the same, or different, threshold temperature values indicating thermal critical conditions. As an example, a thermal critical condition for a temperature sensor that measures temperature values internal to an SoC may be at or above 110 degrees Celsius (C), whereas a threshold thermal critical condition for a temperature sensor that measures temperature values of an exterior of a user device that a user might touch (e.g., a display, surface, etc.) may be at or above 65 degrees C. In some instances, thermal critical conditions may require active cooling techniques (e.g., increasing a fan to full speed, using a liquid cooling system, powering down one or more components of the user device, reset both SoCs0 of the user device, etc.) to lower the temperature of the user device and remedy the thermal critical condition.

According to the techniques described herein, a first SoC and a second SoC of a user device having multiple SoCs may coordinate to identify, and recover from, thermal critical conditions. As noted above, the first SoC may monitor one or more temperature sensors that are coupled to the first SoC, and the second SoC may monitor one or more temperature sensors that are coupled to the second SoC. The first SoC may determine that temperatures indicated by the first temperature sensors are less than threshold temperature(s) associated with thermal critical conditions. However, the second SoC may determine that a temperature associated with a second temperature sensor is greater than or equal to a threshold temperature associated with a thermal critical condition. As an example, a second temperature sensor located in the second SoC may indicate a temperature of over 110 degrees Celsius (C), where 110 degrees C. is associated with a thermal critical condition of the second SoC. In such an example, the second SoC may provide an indication of the second temperature sensor indicating the thermal critical condition to the first SoC using a communication interface (e.g., a General Purpose Input/Output (GPIO) pin, and Ethernet connection, a serial peripheral interface (SPI), etc.). The second SoC may provide the indication for a predefined period of time to allow the first SoC to detect the indication over the interface, and proceed to reset after the period of time. Similarly, the first SoC may, upon detecting the indication, reset or otherwise power down. In this way, the first SoC and second SoC may coordinate the detection and recovery from a thermal critical condition, despite the first SoC being unable to monitor the second temperature sensor that indicated the thermal critical condition.

In some examples, the first SoC and second SoC may further coordinate to restart and resume normal operations for the user device. For instance, the first SoC and second SoC may communicate to ensure that the user device has cooled and the thermal critical condition has passed. In some instances, the first SoC and second SoC may reset and reboot to a first bootloader and a second bootloader, respectively (e.g., Little Kernel, U-Boot, etc.). In such examples, the first SoC may be configured to set a flag, or indicator, that the user device was reset due to a thermal critical condition. In this way, when the first SoC and the second SoC reboot to their respective bootloaders, the first bootloader may identify the flag being set and determine that the SoCs were reset to recover from a thermal critical condition.

Upon detecting the flag being set, the first bootloader may remain in bootloader stage for a threshold period of time to allow the user device to cool. After the period of time, the first SoC may determine whether the first temperature sensor (s) indicate a thermal critical condition. The first SoC may continue to monitor the first temperature sensor(s) until a thermal critical condition is no longer detected. However, if the first temperature sensor(s) do not indicate a thermal critical condition, the first bootloader may determine that the second temperature sensors indicated the thermal critical condition, and may cause the second SoC to be reset. The second SoC may similarly reboot to the second bootloader, and the second bootloader may monitor the second temperature sensors until the thermal critical condition has cleared and the temperatures are below a threshold temperature. The first bootloader and the second bootloader may prevent the SoCs from launching the kernels for a predefined period of time to ensure that the thermal critical condition clears. After the period of time, the first bootloader may boot to the first kernel on the first SoC, and the second bootloader may boot to the second kernel on the second SoC. Thus, the SoCs may coordinate rebooting to normal operation until the thermal critical condition has cleared and the device is sufficiently cooled.

In some instances, the SoCs may monitor temperatures associated with various components. For instance, the user device may include a motor that controls a position of the user device and/or controls the position of components of the user device. The motor may be controlled by a motor control unit (MCU), and the MCU and/or the motor may have one or more temperature sensors used to detect temperatures around the MCU and/or motor. In an example, the temperature sensors may be thermistors that generate an analog signal, such as a voltage signal, corresponding to temperatures. To read the thermistors of the MCU and/or motor, the first SoC may execute a virtual analog-to-digital (ADC) driver that tunnels through an interface, such as an SPI interface, to obtain the and convert the voltage signals from the thermistors. The virtual ADC driver may execute to obtain the voltage values from the thermistors, and convert the voltage values into digital signals that are translated into temperature values. In this way, the first SoC may include a virtual ADC driver to behave as a traditional ADC channel to enable software running on the first SoC to monitor temperature sensors of an MCU and/or motor (or other components of the user device). In this way, thermistors that are directly attached to an MCU and/or motor may be monitored by the first SoC to detect thermal critical conditions, and coordinate a reset of the user device to cool down the user device and allow the thermal critical condition to clear.

The techniques described herein enable user devices with multiple SoCs to coordinate the detection of, and recovery from, thermal critical conditions experienced by a component of the user devices. If each of the SoCs were to behave independently to resolve a thermal critical condition, then the user device may power down certain components controlled by one of the SoCs, but not components controlled by another SoC, which may cause device to malfunction or not work correctly. Accordingly, the techniques described herein improve the functioning of user devices with multiple SoCs by coordinating the identification of, and recovery from, thermal critical conditions to ensure that the user devices operate correctly and provide a consistent and enjoyable user experience. Although described as being applicable to SoCs, the techniques are equally applicable to any device with multiple processors, and may be applicable to other types of integrated circuits as well.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 including a user device 102 with multiple SoCs that each monitor one or more respective temperatures sensors. FIG. 1 illustrates one of the SoCs detecting a thermal critical condition, and notifying the other SoC of the thermal critical condition over an interface. The two SoCs then coordinate resetting their respective processors to respective bootloaders, and when the thermal critical condition has cleared, launching the operating systems of the multiple SoCs to resume normal operation of the user device 102.

The user device 102 may comprise any sort of client computing device that may include multiple SoCs, such as a voice-controlled assistant device, a tablet computing device, a smart television (TV), a laptop computer, a desktop computer, a mobile phone, a display device, and audio device, a gaming device, and/or the like. As illustrated, the user device 102 may include a first SoC 104 and a second SoC 106 (although additional SoCs, integrated circuits (ICs), and/or processors may be included). Although described as SoCs, the SoCs may comprise any type of integrated circuits that include a processor.

The first SoC 104 may include one or more first processors 108, and first memory 110 that is storing a first thermal engine 112. Further, the user device 102 may include one or more first internal temperature sensors 114 located inside the first SoC 104, and/or one or more first external temperatures sensors 116 coupled to the first processor(s) 108, but located exterior the first SoC 116. Similarly, the second SoC 106 may include one or more second processors 118, and second memory 120 storing a second thermal engine 122. Further, the user device 102 may include one or more second internal temperature sensors 124 located inside the second SoC 106, and/or one or more second external temperatures sensors 126 coupled to the second processor(s) 118, but located exterior the second SoC 124.

Generally, the first processor(s) 108 and second processor(s) 106 may comprise any type of processor and include a central processing unit (CPU) for processing data and computer-readable instructions. The first memory 110 and second memory 120 may comprise various types of memory, such as storage (e.g., embedded MultiMediaCard (eMMC), solid state drive (SSD), etc.), memory (e.g., Random-Access Memory (RAM), synchronous dynamic RAM (SDRAM), etc.), flash memory, non-volatile read only memory (ROM), non-volatile magnetoresistive (MRAM) and/or other types of memory. The first memory 110 and second memory 120 may comprise computer-readable media storing instructions that are executable on the first processor(s) 108 and the second processor(s) 118.

The first thermal engine 112 and the second thermal engine 122 may be executable software that causes the first SoC 104 and second SoC 106, respectively, to perform various operations for detecting and recovering from thermal critical conditions. For instance, the first thermal engine 112 and the second thermal engine 122 may be configured to periodically, or continuously, monitor temperatures indicated by the first internal temperature sensors 114, first external temperature sensors 116, second internal temperature sensors 124, and/or the second external temperature sensor(s) 126 (collectively referred to herein as "temperature sensors 114, 116, 124, and/or 126"). The temperature sensors 114, 116, 124, and/or 126 may comprise any type of temperature sensors, such as thermocouples, resistance temperature detectors (RTDs), thermistors, etc. In some instances, the temperature sensors 114, 116, 124, and/or 126 may be thermistors where temperature changes cause measurable resistance changes. The thermistors may be used in conjunction with a fixed value resistor form a voltage divider with an output that is digitized by an ADC. Thus, each of the temperature sensors 114, 116, 124, and/or 126 may be a thermistor that has a corresponding ADC to convert the analog voltage signals into digital signals. The digital signals may then be mapped to, or translated to, temperatures as known in the art.

In some instances, the temperature sensors 114, 116, 124, and/or 126 may be used to create or determine virtual sensors in the user device 102. For instance, temperatures indicated by one or more of the temperature sensors 114, 116, 124, and/or 126 may be used in to extrapolate and determine temperatures in areas of the user device 102 that do not have temperature sensors. Thus, the temperature sensors 114, 116, 124, and/or 126 may correspond to physical sensors, and/or virtual sensors, or any combination thereof.

The first SoC 104 and the second SoC 106 may be communicatively coupled to each other using one or more interfaces 112. The interface(s) 112 may comprise any type of interface usable to couple the first SoC 104 and the second SoC 106, such as one or more GPIOs of the SoCs, an SPI, Ethernet, and so forth. The interface(s) 112 may be used by the first SoC and second SoC 106 to communicate and coordinate for identifying, and recovering from, thermal critical conditions.

At "1," the first thermal engine 112 on the first SoC 104 may determine that a first temperature sensor 114 and/or 116 does not indicate a thermal critical condition. That is, the first thermal engine 112 may monitor one or more ADCs associated with the first temperature sensor 114 and/or 116 to determine that the measured temperatures are less than predefined threshold temperatures indicating a thermal critical condition for the temperature sensor 114 and/or 116. As described herein, the temperature sensors 114, 116, 124, and/or 126 may each be associated with one or more threshold temperatures indicating thermal critical conditions. The threshold temperatures may be the same for one or more temperature sensors 114, 116, 124, and/or 126, or different for each or one or more of the temperature sensors 114, 116, 124, and/or 126. The temperature sensors 114, 116, 124, and/or 126 may have different temperature thresholds determined for the area of the user device 102 that is being monitored. For instance, a temperature threshold for a temperature sensor 116 may be roughly 65 degrees C. as it is measuring temperatures for an exterior of the user device 102 that is touched by a user, whereas a temperature threshold for an internal temperature sensor 114 may be 115 degrees C. for the first processor 108. Generally, the threshold temperatures may indicate thermal critical conditions for the respective temperature sensors 114, 116, 124, and/or 126.

At "2," the second thermal engine 122 of the second SoC 106 may determine that a second temperature sensor 124 and/or 126 indicates a thermal critical condition (e.g., represents a temperature above a threshold temperature). At "3," the second thermal engine 122 of the second SoC 106 may provide an indication of the thermal critical condition to the first SoC 104 via the interface(s) 112. In some instances, the indication may simply be asserting a logic high or logic low signal on a GPIO pin (e.g., setting a flag). In other examples, the indication may be a message sent via an Ethernet interface 112, or a message sent via an SPI interface. However, any type of indication may be used to indicate that a thermal critical condition was detected by the second SoC 106.

At "4," the first thermal engine 112 at the first SoC 104 may identify the indication of the thermal critical condition on the interface 112. For instance, the first thermal engine 112 may determine that the GPIO pin is set or has a logic signal placed on it indicating the thermal critical condition. At "5," the first thermal engine 112 may reset the first processor 108 of the first SoC to a first bootloader. Generally, resetting the first processor 108 causes components controlled by the first processor 108 to reset or power down, thereby consuming less power and emitting less heat.

At "6," the second thermal engine 122 may reset the second processor 118 to a second bootloader. Generally, resetting the second processor 118 causes components controlled by the second processor 118 to reset or power down, thereby consuming less power and emitting less heat.

At "7," at least one of the first SoC 104 or the second SoC 106 may determine that the user device 102 has cooled. For instance, the at least one of the first SoC 104 or the second SoC 106 may determine that the temperature sensors 114, 116, 124, and/or 126 indicate temperatures that are less than the threshold temperature(s) associated with the thermal critical conditions. In some instances, the first SoC 104 or the second SoC 106 may determine that the temperatures have dropped below a second threshold indicating the user device 102 has cooled enough (e.g., a temperature threshold much less the thermal critical condition to ensure user device 102 is sufficient cooled). In some instances, the first SoC 104 or the second SoC 106 may simply wait for a predefined period of time (e.g., cooling time) that is determined to be sufficient to allow the user device 102 to cool.

At "8," the first SoC 104 may launch a first operating system after the user device 102 has cooled. Further, at "9," the second SoC may launch a second operating system after the user device 102 has cooled. In this way, the user device 102 may resume normal operations as the first SoC 104 and second SoC 106 have launched their operating systems to perform normal operations.

Figure 2:
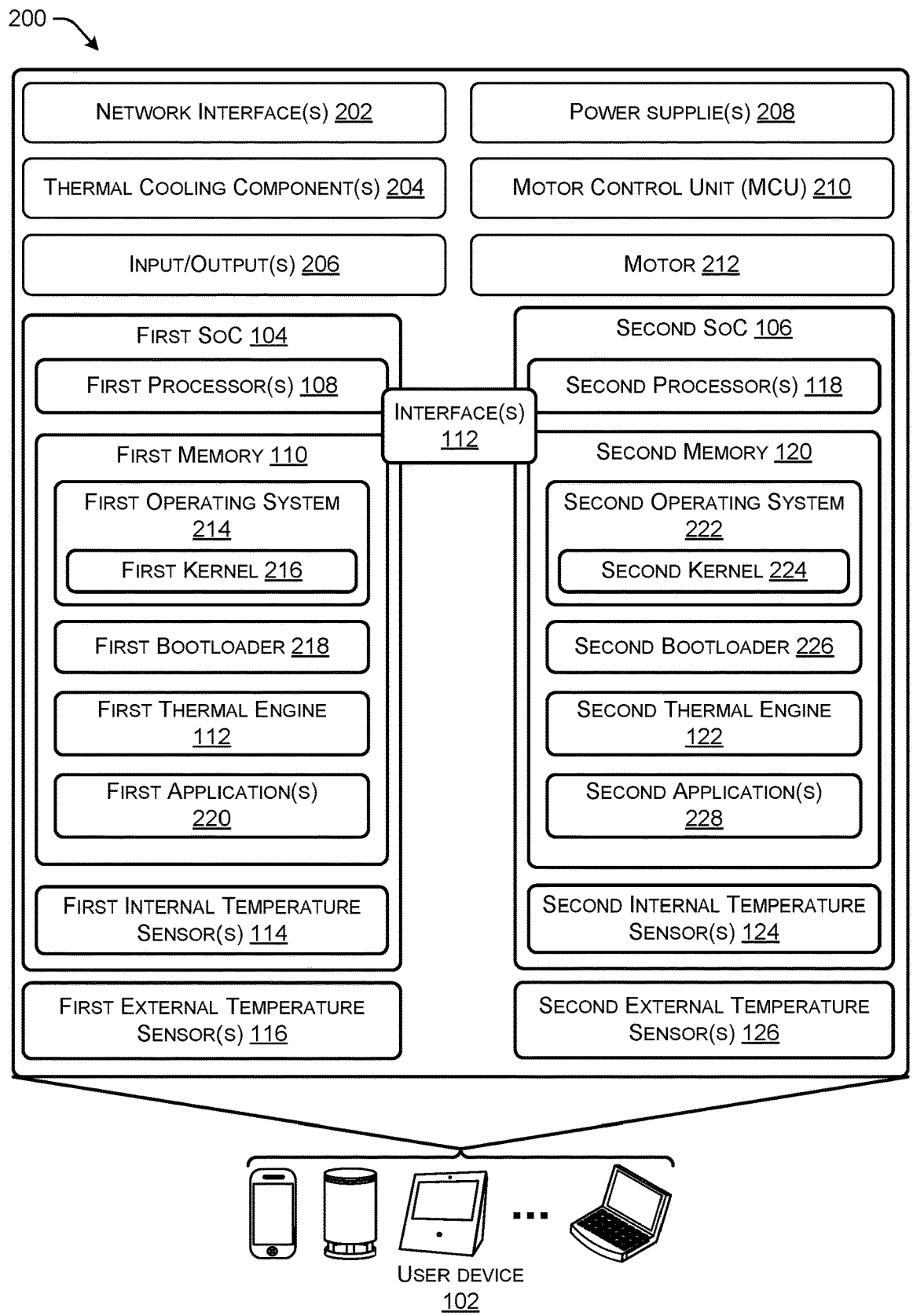
FIG. 2 illustrates example components of the user device of FIG. 1.

FIG. 2 illustrates an example component diagram 200 of the user device 102 of FIG. 1. In addition to components described in FIG. 1, the user device 102 may further include one or more network interfaces 202 that enables the user device to communicate with other devices. The network interface(s) 202 may be a radio, network interface card (NIC), software components, and/or any other hardware, software, or any combination thereof to enable the user device 102 to communicate over various networks and using various protocols. Further, the user device 102 may include one or more thermal cooling components 204 to cool the device, such as passive cooling components (e.g., heat sinks), and active cooling components 204 (e.g., fans, liquid cooling systems, etc.). Further, the user device 102 may include one or more input/outputs 206, such as buttons, displays, touch screens, microphones, speakers, lights, sensors, haptic sensors, and/or any other means to receive inputs and provide outputs. Further, the user device 102 may include one or more power supplies 208, such as a battery or a means to connect to a power grid.

In some instances, the user device 108 may include an MCU 210 that is configured to control a motor 212. The MCU 210 may comprise any assembly to control the motor 212 from a central location (e.g., software, firmware, hardware, etc.), and may consist of multiple enclosed sections having a common power bus and with each section containing a combination start, which may consist of motor starter, fuses or circuit breaker, and power disconnect. The motor 212 may comprise any type of motor 210 and may control the positioning of the user device 102, and/or positioning of components of the user device 102.

The first memory 110 may further include a first operating system 214 that in turn includes a first kernel 216. Further, the first memory 110 may include a first bootloader 218, as well as one or more first applications 220. Similarly, the second memory 120 may include a second operating system 222 that in turn includes a second kernel 224. Additionally, the second memory 120 may store a second bootloader 226 along with one or more second applications 228. Generally, the first operating system 214 and the second operating system 222 may each comprise any type of operating system that supports the functioning of the respective SoC, such as scheduling tasks, executing applications 220/228, and controlling peripherals. Further, the first kernel 216 and the second kernel 224 may each comprise any type of kernel that behaves as a bridge between software and hardware of the system, and may each be any type of kernel configured to execute on an SoC.

The first bootloader 218 and second bootloader 226 may generally comprise any type of bootloader, such as Little Kernel, U-Boot, and so forth. The bootloaders 218 and 226 may comprise code that runs after powering up, or resetting, the SoCs 104 and 106 before any other software starts running on the processors 108 and/or 118. The bootloaders 218 and 226 may be configured to load essential software, such as the operating systems 214/222 and/or kernels 216/224. Further, the first bootloader 218 and second bootloader 226 may be configured to perform various operations described herein for identifying, and recovering from, thermal critical conditions.

Figure 3A:
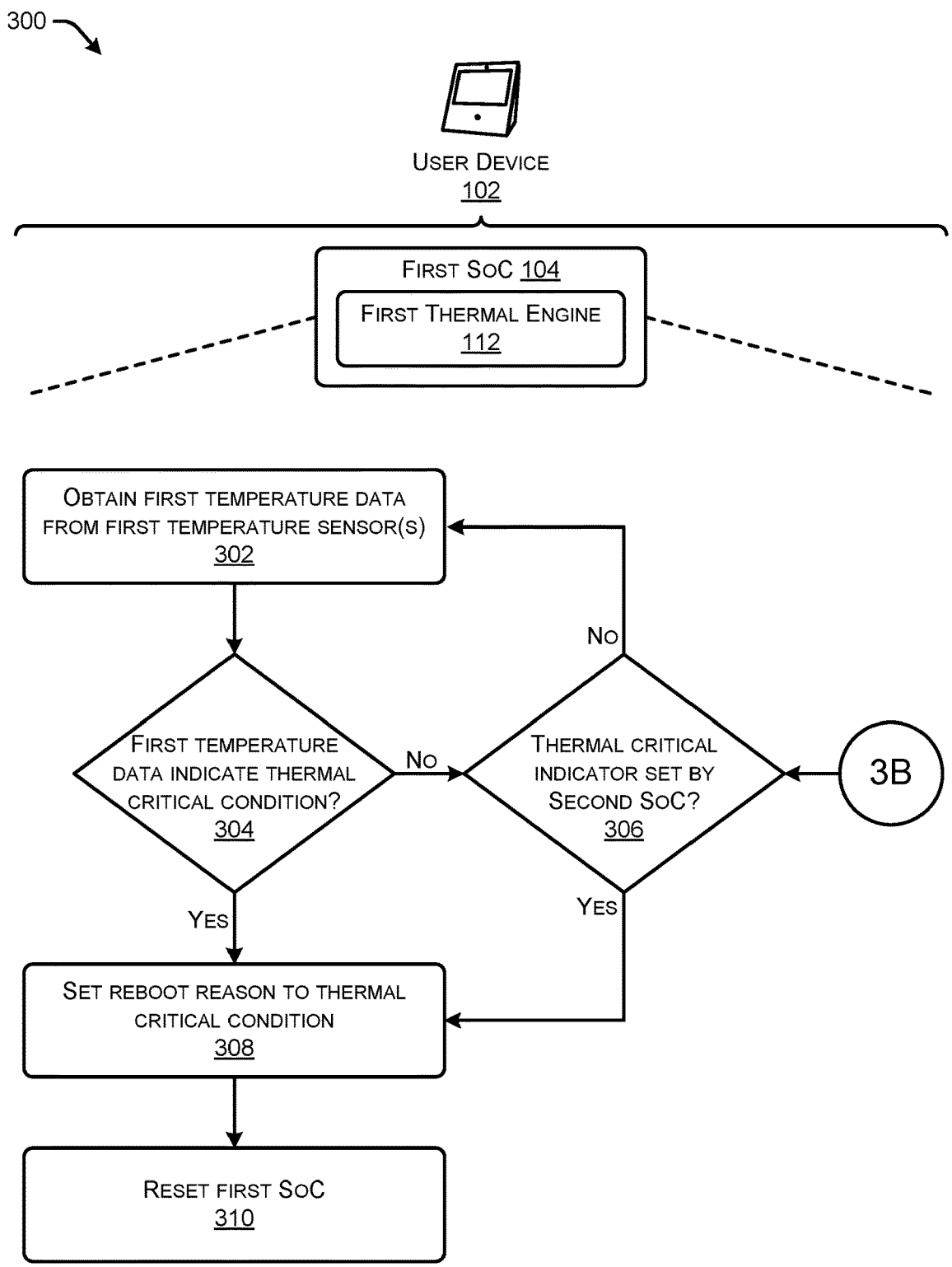
FIGS. 3A and 3B collectively illustrate a first SoC of a user device monitoring a first temperature sensor for a thermal critical condition, and a second SoC of the user device monitoring a second temperature sensor for a thermal critical condition. Upon the second SoC detecting a thermal critical condition, the second SoC sets a thermal indicator to notify the first SoC of the thermal critical condition, and the SoCs each reset to allow the user device to cool down.
Figure 3B:
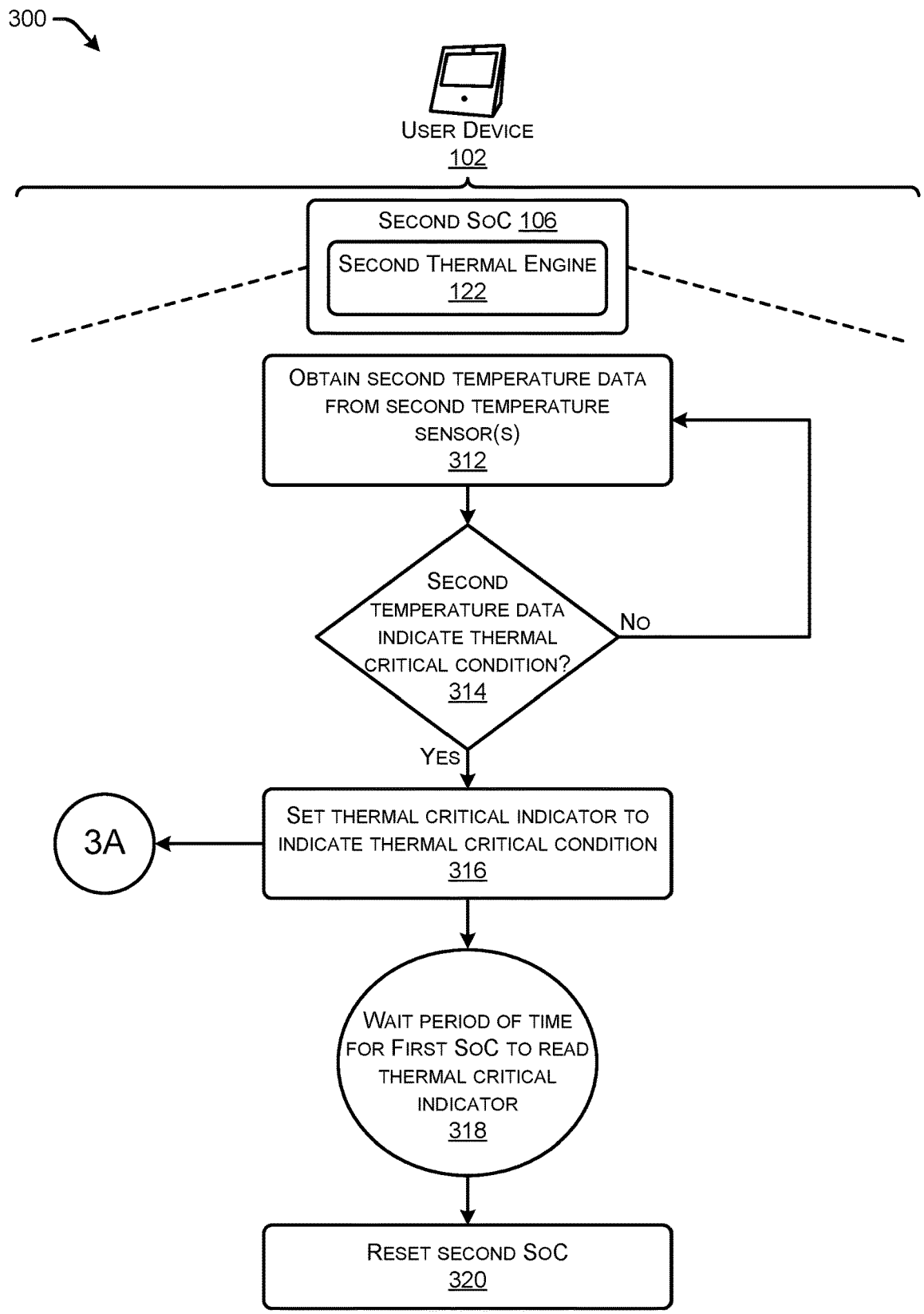

FIGS. 3A and 3B collectively illustrate a flow 300 of a first SoC 104 of a user device 102 monitoring a first temperature sensor 114/116 for a thermal critical condition, and a second SoC 106 of the user device 102 monitoring a second temperature sensor 124/126 for a thermal critical condition. Upon the second SoC 106 detecting a thermal critical condition, the second SoC 106 sets a thermal indicator to notify the first SoC 104 of the thermal critical condition, and the SoCs 104/106 each reset to allow the user device 102 to cool down.

At 302, the first thermal engine 112 may obtain first temperature data from one or more first temperature sensors 114/116. For instance, the first thermal engine 112 may read data from an ADC associated with a first temperature sensor 114/116 that is connected to the first processor 108. At 304, the first thermal engine 112 may determine whether the first temperature data indicates a thermal critical condition. For instance, the first thermal engine 112 may determine whether the first temperature data represents a temperature that is greater than or equal to a threshold temperature.

If the first thermal engine 112 determines that no, there is no thermal critical condition, the first thermal engine 112 will determine, at 306, whether the thermal indicate is set by the second SoC 106. That is, the first thermal engine 112 will determine whether a GPIO of the first SoC 106 has a logic signal placed thereon that indicates the second SoC 106 experienced a thermal critical condition. If the first thermal engine 112 determines at 306 that no, the thermal indicator has not been set, the first thermal engine 112 may go back to 302 and monitor the first temperature sensors 114/116. However, if the first thermal engine 112 determines at 306 that the thermal indicator has been set, the first thermal engine 112 may set a reboot reason to thermal critical condition at 308. In some instances, setting the reboot reason to indicate the thermal critical condition may include setting a value in a register associated with the first SoC 104 that persists on a reboot. While setting the reboot reason to thermal critical condition may be performed by setting a value in a register, the indication of the reboot reason may be indicated using any mechanism that persists through a reset, such as writing a value to a file system that persists through a reset.

After setting an indication that persists through a reset to indicate that the reboot reason was due to a thermal critical condition, the first thermal engine 112 may cause the first SoC 104 to reset. In some instances, however, the first thermal engine 112 may determine, at 304, that the first temperature data indicates a thermal critical condition (e.g., the represented temperature is above a threshold temperature), then the first thermal engine 112 may set the reboot reason at 308 and reset the first SoC 104 at 310.

FIG. 3B illustrates operations performed by the second thermal engine 122 of the second SoC 106. At 312, the second thermal engine 122 may obtain second temperature data from one or more second temperature sensors 124/126. At 314, the second thermal engine 122 may determine whether the second temperature data indicates a thermal critical condition (e.g., above a threshold temperature). If the second temperature data does not indicate a thermal critical condition, the second thermal engine 122 may proceed back to 312 and monitor the second temperature sensor(s) 124/126. Alternatively, if the second temperature data indicates the thermal critical condition at 314, the second thermal engine may set the thermal indicator at 316 to indicate the thermal critical condition. At 318, the second thermal engine 122 may wait for a predefined period of time for the first SoC 104 to read the thermal indicator. After the period of time, the second thermal engine 122 may reset the second SoC 320.

Figure 4A:
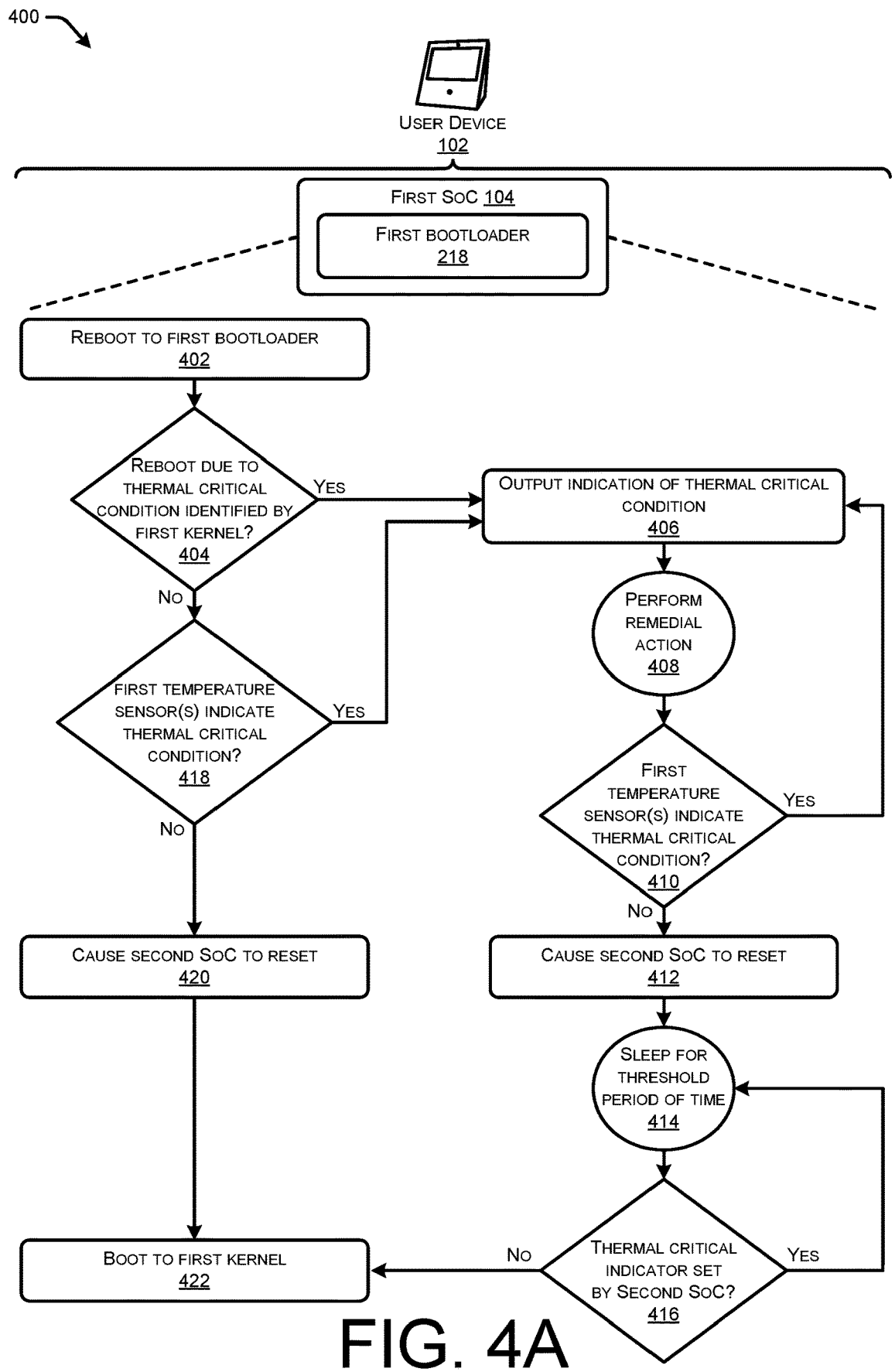
FIGS. 4A and 4B collectively illustrate rebooting a first SoC and a second SoC to respective bootloaders to determine whether a thermal critical condition has cleared. Upon determining that a critical condition has cleared, each bootloader launches respective kernels on the first SoC and the second SoC.
Figure 4B:
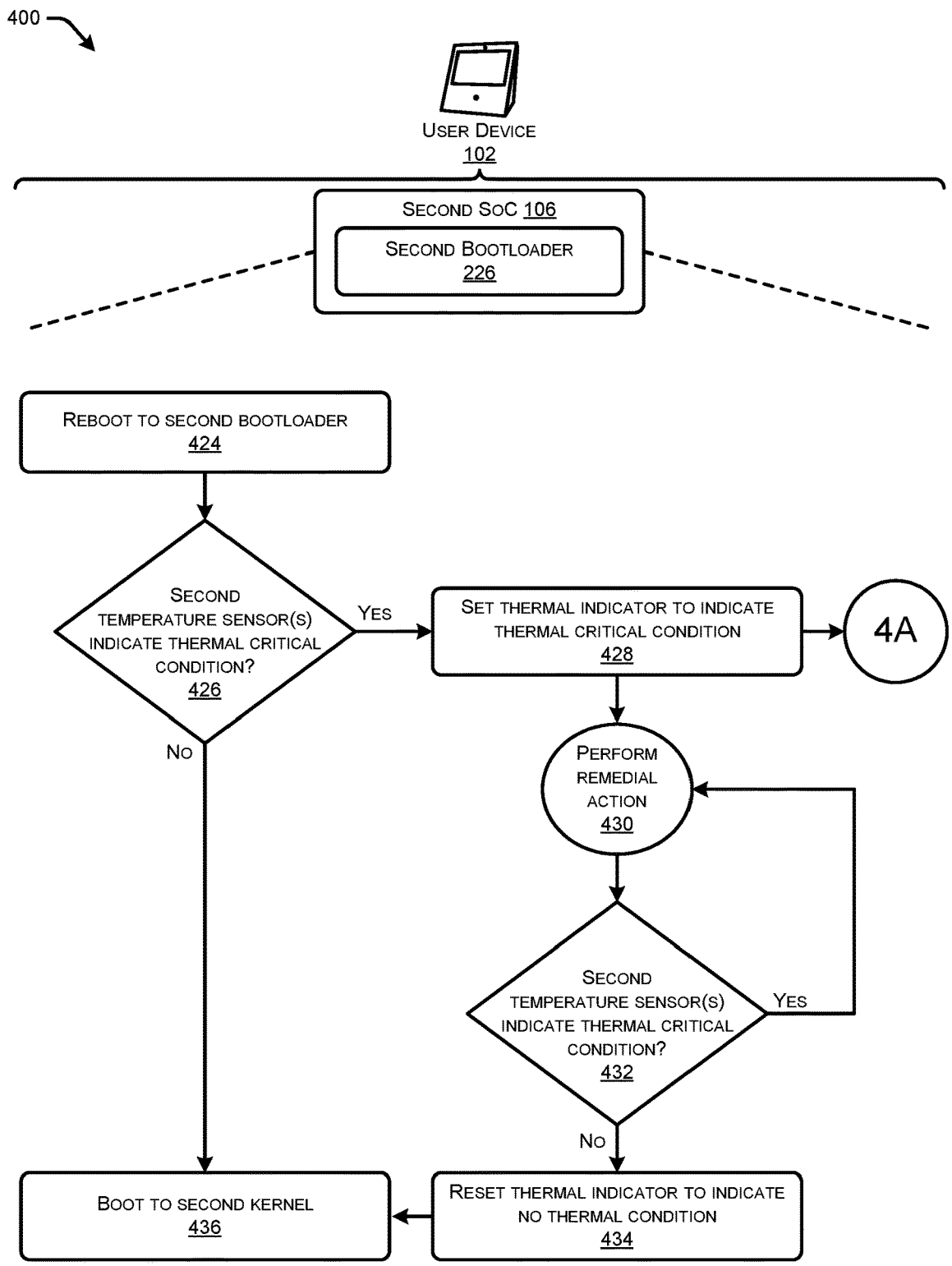

FIGS. 4A and 4B collectively illustrate a flow diagram 400 of rebooting a first SoC 104 and a second SoC 106 to respective bootloaders 218/226 to determine whether a thermal critical condition has cleared. Upon determining that a critical condition has cleared, each bootloader 218/226 launches respective kernels on the first SoC 104 and the second SoC 106.

At 402, the first SoC 104 may reboot to a first bootloader 218. At 404, the first bootloader 218 may determine whether the reboot was due to a thermal critical condition identified by the first kernel 404. For instance, the first bootloader 218 may check the resistor to determine whether the flag persisted through the reset. If the reboot was due to a thermal critical condition identified by the first kernel 404, the first bootloader 402 may output an indication of the thermal critical condition 406 on a display 204, via one or more LEDs 204, and/or using a microphone 204 (e.g., an alert). Further, the first bootloader 218 may perform a remedial action (e.g., sleep for a threshold period of time at 408, activate a fan or cooling system, etc.) to cool the user device 104, and check at 410 whether the first temperature sensor(s) 114/116 indicate a thermal critical condition (e.g., a temperature that is above the threshold). If the first temperature sensors do not indicate a thermal critical condition at 410, the first bootloader 402 causes the second SoC 106 to reset at 412, sleeps for a threshold period of time at 414, and determines whether the thermal indicator is set by the second SoC 106 and 416.

However, at 404, if the first bootloader 218 determines that the reboot is not due to a thermal critical condition identified by the first kernel 404, the first bootloader 218 may determine at 418 whether the first temperature sensors 114/116 indicate a thermal critical condition. If the first temperature sensor(s) 114/116 do not indicate a thermal critical condition, the first bootloader 218 may cause the second SoC 106 to reset at 420, and may further cause the first processor 108 to boot to the first kernel 216 at 422.

At 424, the second bootloader 226 may reboot on the second processor 118 to a second bootloader 226. In some instances, prior to performing the actions of step 426, the second processor 118 may wait for an indication from the first SoC 104 to proceed to performing any further operations and may simply wait for an indication from the first SoC 104 while in the second processor 118 is in the second bootloader 226. At 426, the second bootloader 226 may determine whether the second temperature sensor(s) 124/126 indicate a thermal critical condition. If the second temperature sensor(s) 124/126 indicate the thermal critical condition, the second bootloader 226 may set the thermal indicator to indicate a thermal critical condition 428, and perform a remedial action at 430 to cool the user device 102 (e.g., sleep for a period of time, activate cooling system, etc.). At 432, the second bootloader 226 may determine whether the second temperature sensor(s) 124/126 indicate a thermal critical condition. If the second temperature sensor(s) 124/126 indicate the thermal critical condition, the second bootloader 226 may reset the thermal indicate to indicate that there is no thermal critical condition at 434 (e.g., change a logic signal on the interface), and boot to the second kernel 224 on the second processor 118 at 436. However, at 426, if the second bootloader 226 determines that the second temperature sensor(s) 124/126 do not indicate a thermal critical condition, the second bootloader 226 may simply boot to the second kernel at 436.

Figure 5:
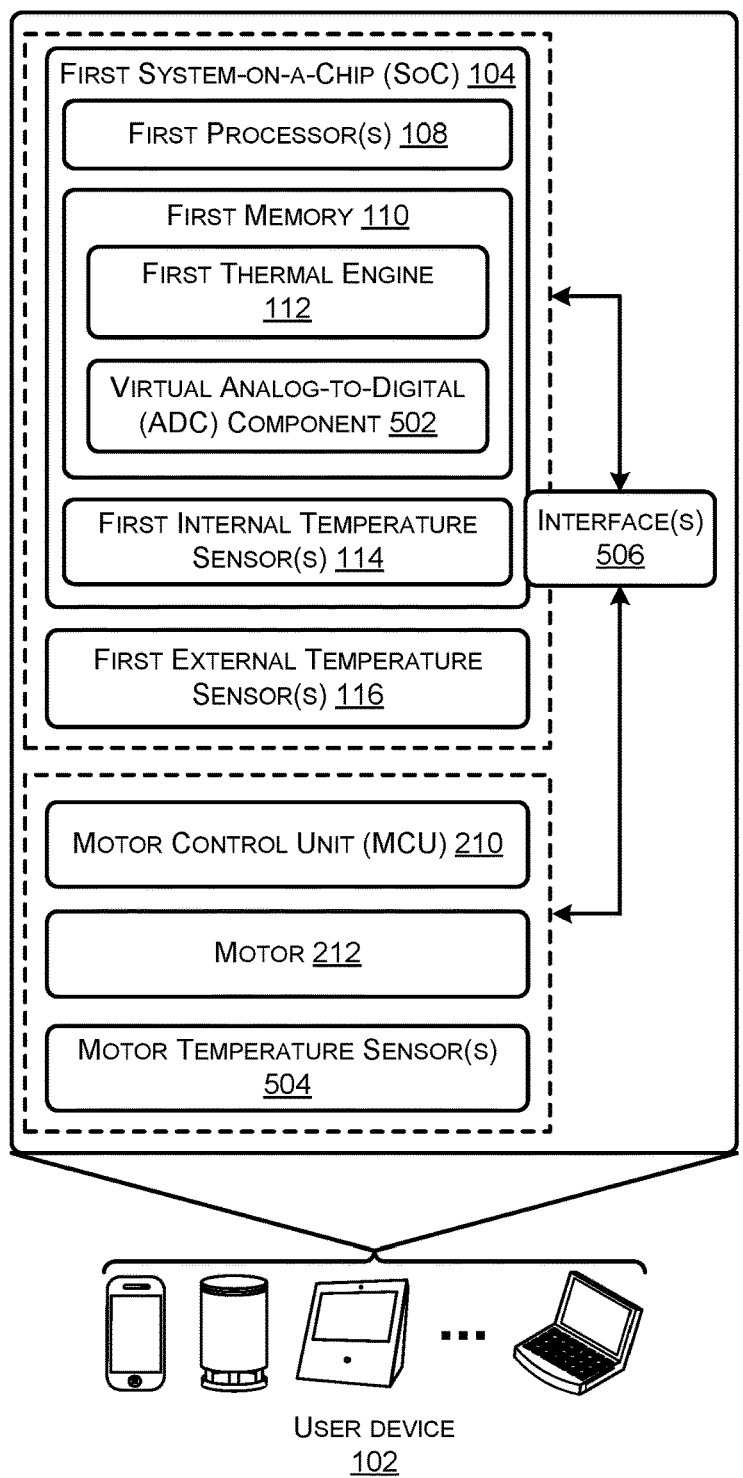
FIG. 5 illustrates another component diagram of an example SoC included in a user device that communicates with a motor control unit (MCU) of the user device. The SoC includes a virtual analog-to-digital (ADC) that is used to monitor signals generated by a temperature sensor associated with the MCU. The SoC users the virtual ADC to detect thermal critical conditions experienced by the MCU (or a controlled motor), and resets the user device.

FIG. 5 illustrates another component diagram of an example SoC included in a user device that communicates with a motor control unit (MCU) of the user device. The SoC includes a virtual analog-to-digital (ADC) that is used to monitor signals generated by a temperature sensor associated with the MCU. The SoC users the virtual ADC to detect thermal critical conditions experienced by the MCU (or a controlled motor), and resets the user device.

As illustrated, the user device 102 may further include a virtual ADC component 502 (e.g., driver) as well as one or more motor temperature sensors 504. The motor 212 may be controlled by a motor control unit (MCU) 210, and the MCU 210 and/or the motor 212 may have one or more temperature sensors 504 used to detect temperatures around the MCU 210 and/or motor 212. In an example, the temperature sensors 504 may be thermistors that generate an analog signal, such as a voltage signal, corresponding to temperatures. To read the thermistors of the MCU 210 and/or motor 212, the first SoC 104 may execute a virtual analog-to-digital (ADC) component 502 that tunnels through an interface 506, such as an SPI interface, to obtain the and convert the voltage signals from the thermistors 504. The virtual ADC component 502 may execute to obtain the voltage values from the temperature sensors 504, and convert the voltage values into digital signals that are translated into temperature values. In this way, the first SoC 104 may include a virtual ADC component 502 to behave as a traditional ADC channel to enable software running on the first SoC 104 (e.g., first thermal engine 112) to monitor temperature sensors of an MCU 210 and/or motor 212 (or other components of the user device). In this way, temperature sensor(s) 504 that are directly attached to an MCU 210 and/or motor 212 may be monitored by the first SoC 104 to detect thermal critical conditions, and coordinate a reset of the user device 104 to cool down the user device 104 and allow the thermal critical condition to clear.

In some instances, if the interface(s) 506 go down or are unavailable for use, the MCY 210 may comprise logic (e.g., firmware, software, etc.) that monitors the temperature sensor(s) 504 to determine whether a thermal critical condition has occurred. If the MCU 210 detects a thermal critical condition has occurred, and the interface 506 is not working or down, the MCU 210 may determine to power down the motor 212.

Figure 6A:
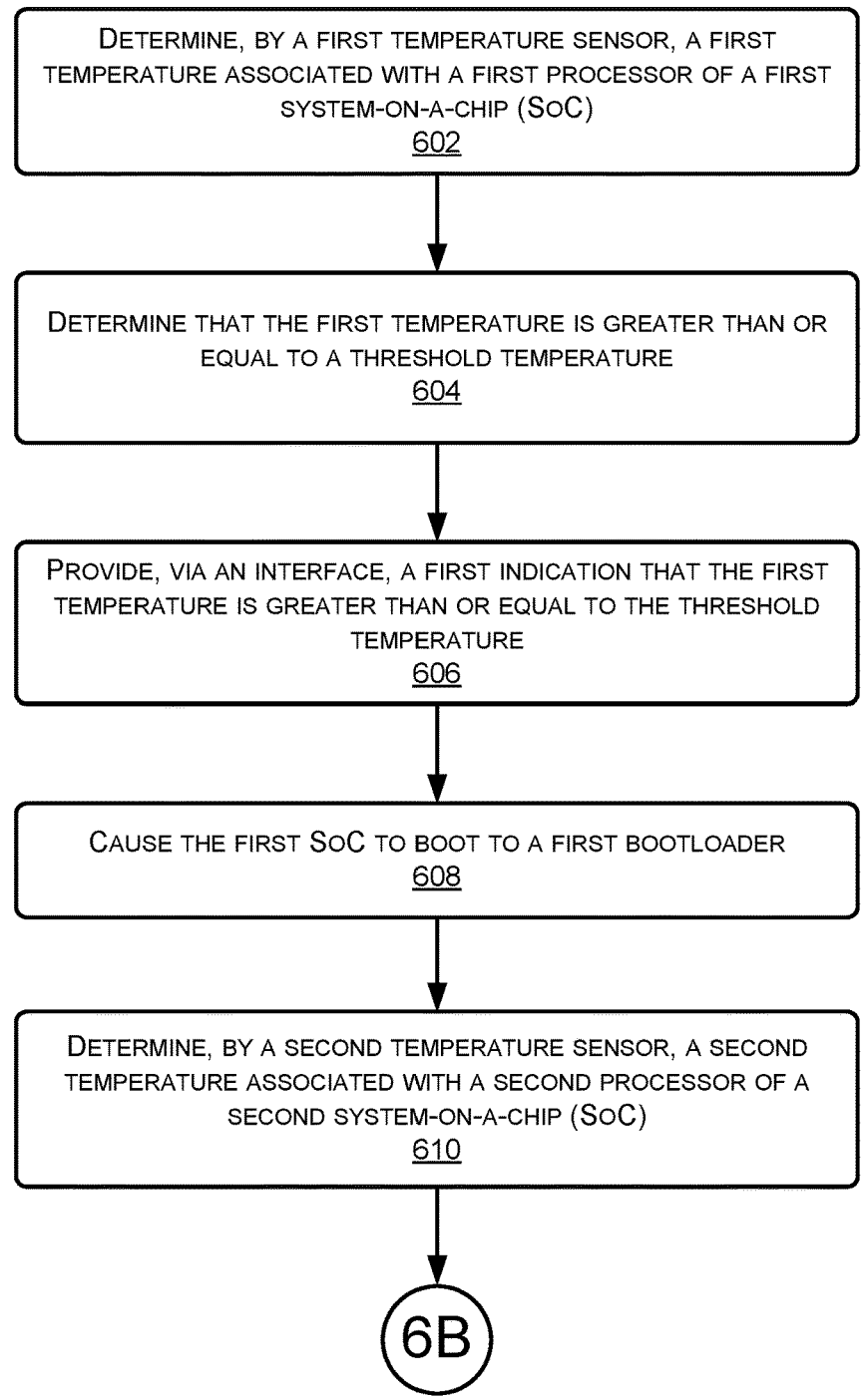
FIGS. 6A and 6B collectively illustrate an example method for a user device with multiple SoCs to detect, by a first SoC, a thermal critical condition indicated by a first temperature sensor, and provide an indication of the thermal critical condition to a second SoC. In this way, each the first SoC and the second SoC coordinate rebooting to respective bootloaders while the user device cools down.
Figure 6B:
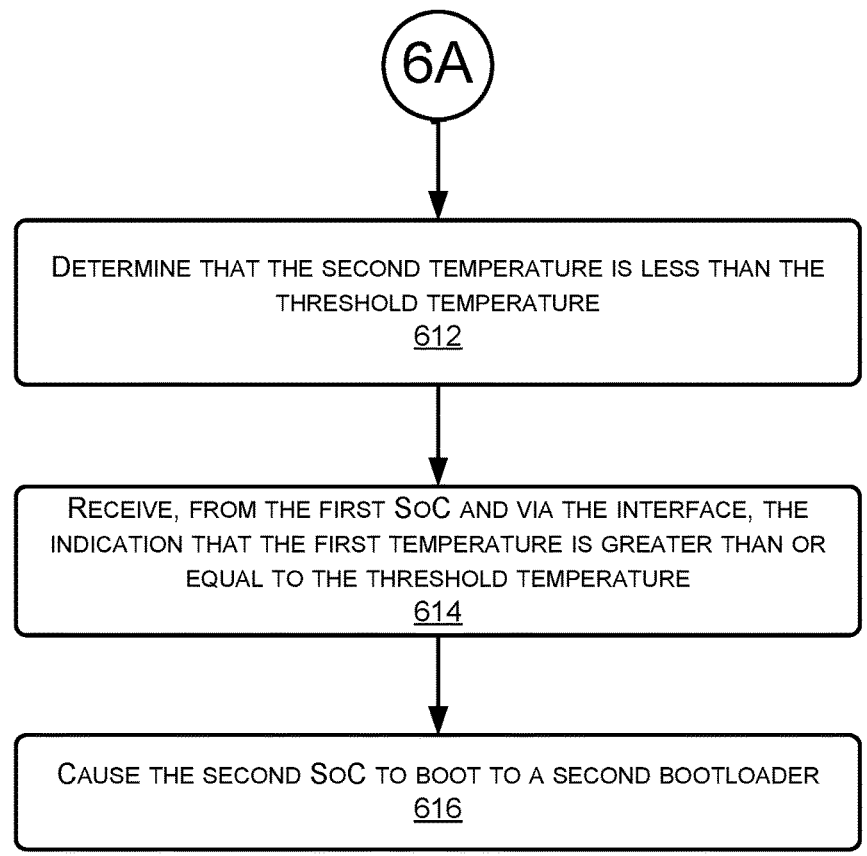
Figure 7:
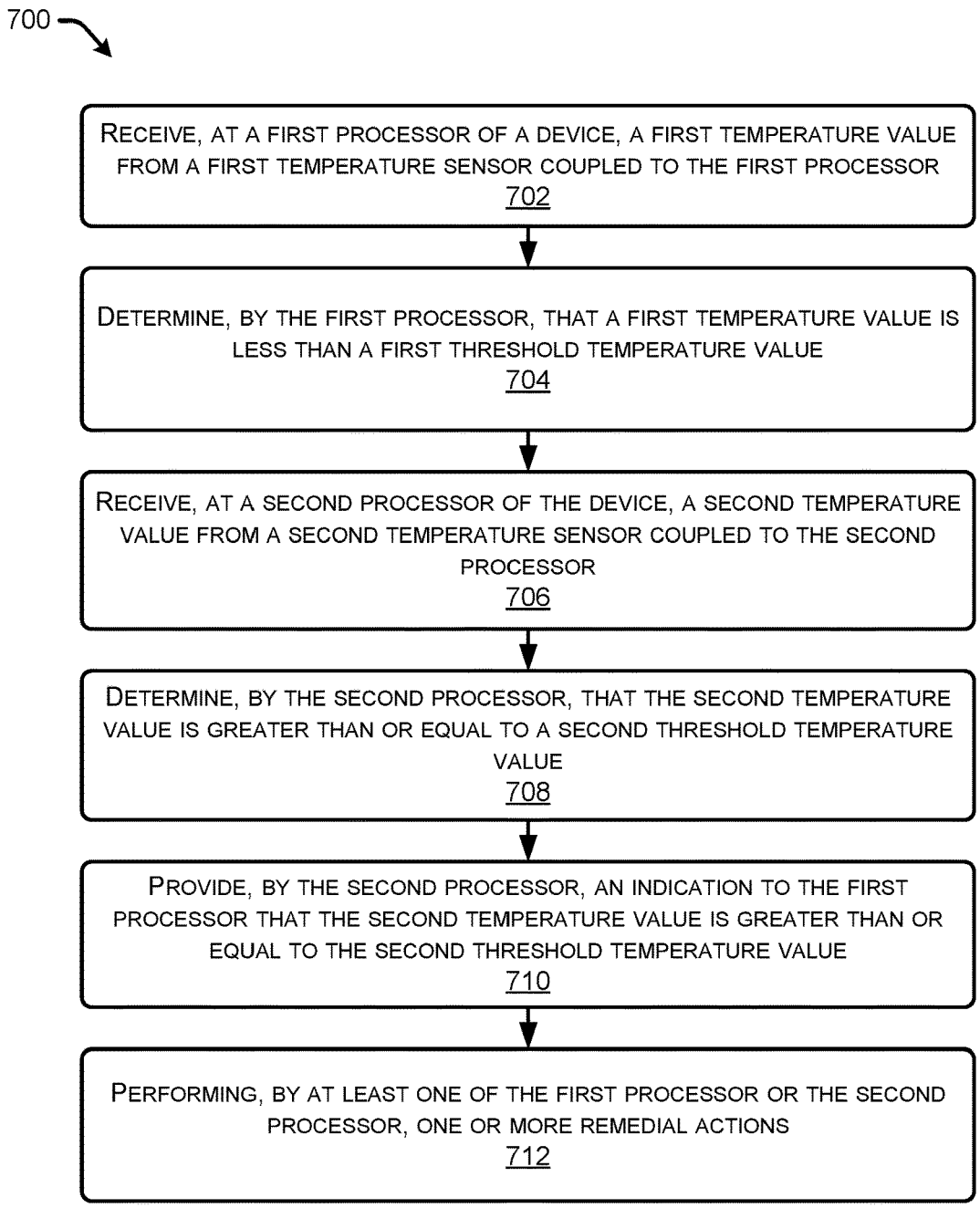
FIG. 7 illustrates another flow diagram of an example method for a user device with multiple processors to coordinate identifying a thermal critical condition, and resetting the processors based on identifying the thermal critical condition.

FIGS. 6A, 6B, and 7 illustrate flow diagrams of an example processes 600 and 700, and 800 for performing the techniques described herein. The processes 600 and 700, as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

FIGS. 6A and 6B collectively illustrate an example method 600 for a user device 102 with multiple SoCs to detect, by a first SoC, a thermal critical condition indicated by a first temperature sensor, and provide an indication of the thermal critical condition to a second SoC. In this way, each the first SoC and the second SoC coordinate rebooting to respective bootloaders while the user device cools down.

At 602, a first temperature sensor of a first SoC may be used to determine a first temperature associated with the first processor. For instance, a second temperature sensor 124/126 may generate an analog voltage signal indicative of a temperature.

At 604, the first SoC may determine that the first temperature is greater than or equal to a threshold temperature. For instance, the second thermal engine 122 may receive a digital signal from an ADC of the second temperature sensor 124/126 and determine that the digital signal represents a temperature that is above a threshold temperature.

At 606, the first SoC may provide, via an interface, a first indication that the first temperature is greater than or equal to the threshold temperature. For instance, the second thermal engine 122 may assert or set a logic signal on a GPIO 112 of the first processor 108 that indicates the temperature indicated by the second temperature sensor 124/126 is greater than or equal to the threshold temperature.

At 608, the first thermal engine may cause the first SoC to boot to a first bootloader. For instance, the second thermal engine 122 may cause the second processor 118 of the second SoC 106 to reset and reboot to a second bootloader 226.

At 610, a second thermistor of a second SoC may be used to determine a second temperature associated with a second processor of a second SoC. For instance, a first temperature sensor 114/116 may generate an analog signal indicating temperature of the first processor 108.

At 612, the second thermal engine may determine that the second temperature is less than the threshold temperature. For instance, the first thermal engine 112 may determine that a digital signal received from an ADC indicates that a temperature of the first processor is less than a threshold temperature associated with a thermal critical condition.

At 614, the second thermal engine may detect, via an interface, the indication that the first temperature is greater than or equal to the threshold. At 616, the second thermal engine may, in response to detecting the indication, causing the second SoC to boot to a second bootloader.

FIG. 7 illustrates another flow diagram 700 of an example method for a user device 102 with multiple processors to coordinate identifying a thermal critical condition, and resetting the processors based on identifying the thermal critical condition.

At 702, a first processor of a device may receive a first temperature value from a first temperature sensor coupled to the first processor. For instance, a first processor 108 may receive a signal from an ADC associated with a first temperature sensor 114/116 indicating a temperature.

At 704, the first processor may determine that a first temperature value is less than a first threshold temperature value. For instance, the first thermal engine 112 may determine that the first temperature is less than a threshold temperature associated with a thermal critical condition for the first temperature sensor.

At 706, a second processor of the device may receive a second temperature value from a second temperature sensor coupled to the second processor. For instance, the second processor 118 may receive, from a second temperature sensor 124/126, second temperature data indicating a temperature.

At 708, the second processor may determine that a second temperature value is greater than or equal to a second threshold temperature value. For instance, the second processor 118 may determine that a second temperature is greater than or equal to a second threshold temperature value associated with a thermal critical condition (which may be the same as, or different than, the first threshold temperature value).

At 710, the second processor may provide an indication to the first processor that the second temperature value is greater than or equal to the second threshold temperature value. For instance, the second processor 118 may assert, or set, a logic signal on the interface 112 (e.g., GPIO pin) that indicates the thermal critical condition.

In some instances, the first processor may detect the indication that the second temperature value is greater than or equal to the second threshold temperature. For instance, the first thermal engine 112 may detect the logic signal asserted on a GPIO pin that indicates the thermal critical condition.

At 712, one or more of the first processor or the second processor may perform one or more remedial actions that reduce the second temperature value. For instance, one or more of the first processor 108 or the second processor 118 may be reset, powered down, reboot to bootloaders, etc. In some instances, the remedial actions may simply be powering down one or more components managed by one or more of the first processor 108 or the second processor 118 (e.g., reducing brightness of a display 206, turning off a motor 212, etc.). In some instances, powering the one or more remedial actions may be resetting the one or more of the first processor 108 or the second processor 118 (e.g., hardware operation to re-initialize the one or more of the first processor 108 or the second processor 118 to respective bootloaders).

As used herein, a processor, such as processor(s) 108 and/or 118, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or 118 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or 118 may possess its own local memory, which also may store program components, program data, and/or one or more operating systems.

As described herein, the memories 110 and 120 may include or comprise computer-readable media and may include volatile and nonvolatile memory, removable and non-removable media implemented in any method or technology for storage of information, such as computer-readable instructions, data structures, program component, or other data. Such computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 108 and/or 118 to execute instructions stored on the computer-readable media. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 110 and/or 120, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A user device comprising:
   a first system-on-a chip (SoC) comprising:
      a first processor;
      a first temperature sensor that determines a first temperature associated with the first processor; and
      one or more first computer-readable media storing first computer-executable instructions that, when executed by the first processor, cause the first processor to perform first operations comprising:
         determining that the first temperature is greater than or equal to a threshold temperature; and
         causing the first SoC to boot to a first bootloader; and
   a second SoC comprising:
      a second processor;
      a second temperature sensor that determines a second temperature associated with the second processor; and
      one or more second computer-readable media storing second computer-executable instructions that, when executed by the second processor, cause the second processor to perform second operations comprising:
         determining that the second temperature is less than the threshold temperature;
         receiving, from the first SoC, a first indication that the first temperature is greater than or equal to the threshold temperature; and
         causing the second SoC to boot to a second bootloader.

2. The user device of claim 1, subsequent to causing the first SoC to boot to the first bootloader and causing the second SoC to boot to the second bootloader, the first operations further comprising:

determining that a third temperature associated with the first processor is less than the threshold temperature; and causing the first SoC to boot to a first kernel; and the second operations further comprising:

receiving, by the second SoC, a second indication that the third temperature is less than the threshold temperature; and causing the second SoC to boot to a second kernel.

3. The user device of claim 1, further comprising:

a motor;

a motor control unit (MCU) that controls the motor;

a third temperature sensor that determines a third temperature associated with at least one of the motor or the motor control unit; and a serial peripheral interface (SPI) coupling the MCU to the first SoC;

the first operations further comprising:

determining that the third temperature is greater than or equal to the threshold temperature; and causing the motor to power down.

4. A method comprising:

receiving, at a first processor of a device, a first temperature value from a first temperature sensor coupled to the first processor;

determining, by the first processor, that the first temperature value is less than a first threshold temperature value;

receiving, at a second processor of the device, a second temperature value from a second temperature sensor coupled to the second processor;

determining, by the second processor, that the second temperature value is greater than or equal to a second threshold temperature value;

providing, by the second processor, an indication to the first processor that the second temperature value is greater than or equal to the second threshold temperature value; and performing, by at least one of the first processor or the second processor, one or more remedial actions.

5. The method of claim 4, further comprising:

booting the first processor to a first bootloader;

receiving, by the first processor from the first temperature sensor, a third temperature value, the third temperature value being less than the first threshold temperature value;

booting the second processor to a second bootloader;

receiving, by the second processor from the second temperature sensor, a fourth temperature value, the fourth temperature value being less than the second threshold temperature value;

causing the first processor to boot a first kernel; and causing the second processor to boot a second kernel.

6. The method of claim 4, wherein performing the one or more remedial actions comprises:

rebooting the first processor to a first bootloader;

determining that a third temperature value received from the first temperature sensor is less than the first threshold temperature value; and causing the second processor to boot to a second bootloader.

7. The method of claim 6, wherein performing the one or more remedial actions comprises:

determining that a fourth temperature value received from the second temperature sensor is less than the second threshold temperature value;

providing, by the second processor, a second indication that the fourth temperature value is less than the second threshold temperature value;

causing the first processor to boot a first kernel; and causing the second processor to boot a second kernel.

8. The method of claim 4, wherein performing the one or more remedial actions comprises:

resetting the first processor; and resetting the second processor.

9. The method of claim 4, further comprising:

rebooting the first processor to a first bootloader;

rebooting the second processor to a second bootloader;

determining a third temperature value received from the second temperature sensor is less than the second threshold temperature value;

providing, by the second processor, a second indication to the first processor that the third temperature value is less than the second threshold temperature value;

causing the first processor to boot to a first kernel; and causing the second processor to boot to a second kernel.

10. The method of claim 4, further comprising:

obtaining, using the first processor, third temperature value at a motor control unit (MCU) of the device;

determining that the third temperature value is greater than or equal to a third threshold temperature value; and causing a motor associated with the MCU to power down.

11. The method of claim 4, wherein performing the one or more remedial actions includes:

booting the first processor to a bootloader;

determining, by the bootloader, that the first processor was reset based on a temperature in the device being greater than or equal to a threshold temperature associated with a critical temperature condition associated with the device;

refraining from booting the first processor from the bootloader to a kernel for a period of time; and subsequent the period of time, causing the first processor to boot to the kernel.

12. A device comprising:

a first processor;

a first temperature sensor coupled to the first processor;

a second processor;

a second temperature sensor coupled to the second processor;

wherein the first processor:

provides an indication to the second processor that a first temperature value, determined using the first temperature sensor, is greater than or equal to a first threshold temperature value, and performs a first remedial action; and wherein the second processor:

determines that a second temperature value, determined using the second temperature sensor, is less than a second threshold temperature value;

receives, from the first processor, the indication that the first temperature value is greater than or equal to the first threshold temperature value; and performs a second remedial action based at least in part on the indication.

13. The device of claim 12, further comprising:

a first system-on-a chip (SoC) comprising:

the first processor;

the first temperature sensor; and a first memory; and a second SoC comprising:

the second processor;

the second temperature sensor; and a second memory.

14. The device of claim 12, wherein the indication is a first indication and wherein further:

the first processor reboots to a first bootloader;

the first processor provides a second indication to the second processor that a third temperature value, determined using the first temperature sensor, is less than the first threshold temperature value;

the first processor boots from the first bootloader to a first kernel;

the second processor reboots to a second bootloader;

the second processor receives the second indication; and the second processor boots from the second bootloader to a second kernel.

15. The device of claim 12, wherein the first processor further:

reboots to a first bootloader;

determines that a third temperature value, determined using the first temperature sensor, is less than the first threshold temperature value; and causes the second processor to boot to a second bootloader.

16. The device of claim 15, wherein the second processor further:

sends to the first processor, a second indication that a fourth temperature value, determined using the second temperature sensor, is less than the second threshold temperature value; and boots from the second bootloader to a second kernel of the second processor.

17. The device of claim 12, wherein:

the first remedial action comprises resetting the first processor to a first bootloader; and the second remedial action comprises resetting the second processor to a second bootloader.

18. The device of claim 17, wherein the second processor further:

sends a third indication to the first processor that a third temperature value, determined using the second temperature sensor, is less than the second threshold temperature value; and boots to from the second bootloader to a kernel.

19. The device of claim 12, wherein the first processor further:

receives a third temperature value at a motor control unit (MCU) of the device;

determines that the third temperature value is greater than or equal to a third threshold temperature value; and causes a motor associated with the MCU to power down.

20. The device of claim 12, wherein the first remedial action includes rebooting the first processor to a bootloader, the first processor further:

determines that the first remedial action was based on a temperature value in the device being greater than or equal to a threshold temperature value associated with a critical temperature condition;

refrains from booting to a kernel for a period of time; and boots to the kernel after the period of time has elapsed.

* * * * *